US012176137B2

(12) United States Patent
Shin et al.

(10) Patent No.: US 12,176,137 B2
(45) Date of Patent: Dec. 24, 2024

(54) COIL COMPONENT

(71) Applicant: SAMSUNG ELECTRO-MECHANICS CO., LTD., Suwon-si (KR)

(72) Inventors: Myoung Ki Shin, Suwon-si (KR); Ji Hoon Hwang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 886 days.

(21) Appl. No.: 17/183,603

(22) Filed: Feb. 24, 2021

(65) Prior Publication Data

US 2022/0181071 A1 Jun. 9, 2022

(30) Foreign Application Priority Data

Dec. 4, 2020 (KR) ........................ 10-2020-0168509

(51) Int. Cl.
*H01F 27/29* (2006.01)
*H01F 1/24* (2006.01)
*H01F 17/00* (2006.01)
*H01F 17/04* (2006.01)
*H01F 27/32* (2006.01)

(52) U.S. Cl.
CPC ............. *H01F 27/292* (2013.01); *H01F 1/24* (2013.01); *H01F 17/0013* (2013.01); *H01F 17/04* (2013.01); *H01F 27/32* (2013.01)

(58) Field of Classification Search
CPC ...... H01F 27/292; H01F 1/24; H01F 17/0013; H01F 17/04; H01F 27/32
USPC ........................................................... 336/199
See application file for complete search history.

(56) References Cited

U.S. PATENT DOCUMENTS

| | | | | |
|---|---|---|---|---|
| 11,017,931 B2 * | 5/2021 | Kang | H01F 3/10 | |
| 11,158,453 B2 * | 10/2021 | Kang | H01F 27/292 | |
| 11,742,131 B2 * | 8/2023 | Kang | H01F 27/29 | 336/192 |
| 2012/0274432 A1 * | 11/2012 | Jeong | H01F 27/2804 | 336/192 |
| 2015/0102891 A1 * | 4/2015 | Yoon | H01F 27/2804 | 336/200 |

(Continued)

FOREIGN PATENT DOCUMENTS

| | | |
|---|---|---|
| JP | 2002-270428 A | 9/2002 |
| KR | 10-1736592 B1 | 5/2017 |

(Continued)

*Primary Examiner* — Shawki S Ismail
*Assistant Examiner* — Joselito S Baisa
(74) *Attorney, Agent, or Firm* — Morgan, Lewis & Bockius LLP

(57) ABSTRACT

A coil component includes: a body having a first surface and a second surface opposing each other, and a side surface connecting the first surface and the second surface to each other; a support member disposed in the body; a coil unit disposed in the body and including a coil pattern disposed on the support member, and first and second lead patterns respectively extending from the coil pattern and exposed to the first surface of the body; a first insulating layer disposed on the first surface of the body and having first and second openings exposing at least a portion of the first and second lead patterns, respectively; and a second insulating layer covering the side surface of the body.

18 Claims, 6 Drawing Sheets

(56) References Cited

U.S. PATENT DOCUMENTS

2020/0027647 A1* 1/2020 Yang .................. H01F 17/0013
2020/0082975 A1* 3/2020 Yang .................. H01F 17/0013
2020/0098508 A1 3/2020 Park et al.
2020/0118729 A1* 4/2020 Lim ...................... H01F 27/324
2021/0350976 A1* 11/2021 Kang ...................... H01F 17/04
2023/0326663 A1* 10/2023 Kim ........................ H01F 17/04

FOREIGN PATENT DOCUMENTS

KR 10-2138885 B1 7/2020
WO WO-2015115180 A1 * 8/2015 ......... H01F 17/0033

* cited by examiner

COIL COMPONENT

CROSS-REFERENCE TO RELATED APPLICATION(S)

The present application claims the benefit of priority to Korean Patent Application No. 10-2020-0168509, filed on Dec. 4, 2020 in the Korean Intellectual Property Office, the disclosure of which is incorporated herein by reference in its entirety.

TECHNICAL FIELD

The present disclosure relates to a coil component.

BACKGROUND

In recent years, as an electronic product, especially a smartphone, has been evolved, there is an increasing demand for a compact power inductor for high current, having high efficiency and high performance.

SUMMARY

An aspect of the present disclosure may provide a coil component for minimizing occurrence of a burring.

Another aspect of the present disclosure may provide a coil component for preventing plating spread.

Yet another aspect of the present disclosure may provide a coil component for preventing deteriorations of inductance (Ls).

Another aspect of the present disclosure may provide a coil component having an enhanced insulation property.

Another aspect of the present disclosure may provide a coil component for miniaturizing a product.

According to an aspect of the present disclosure, a coil component may include: a body having a first surface and a second surface opposing each other, and a side surface connecting the first surface and the second surface to each other; a support member disposed in the body; a coil unit disposed in the body and including a coil pattern disposed on the support member and first and second lead patterns respectively extending from the coil pattern and exposed to the first surface of the body; a first insulating layer disposed on the first surface of the body and having first and second openings exposing at least a portion of each of the first and second lead patterns, respectively; and a second insulating layer covering the side surface of the body.

According to another aspect of the present disclosure, a coil component may include: a body; a support member disposed in the body; a coil unit disposed in the body and including first and second coil patterns respectively disposed on opposite surfaces of the support member and first and second lead patterns respectively extending from the first and second coil patterns and exposed to a first surface of the body; an insulating layer disposed on the first surface of the body and having first and second openings respectively exposing the first and second lead patterns; and first and second external electrodes respectively having at least a portion disposed in the first and second openings and respectively connected to the first and second lead patterns, wherein the first and second coil patterns are opposing each other in a direction substantially parallel to the first surface of the body.

According to still another aspect of the present disclosure, a coil component may include: a body having a first surface and a second surface opposing each other in a first direction; a support member disposed in the body; a coil unit disposed in the body and including a coil pattern disposed on the support member and first and second lead patterns respectively extending from the coil pattern and exposed to the first surface of the body; a first insulating layer and a second insulating layer disposed on the first surface of the body and at least partially overlapping each other in the first direction; and first and second external electrodes each penetrating through the first and second insulating layers and respectively connected to the first and second lead patterns.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Coil Component

Figure 1:
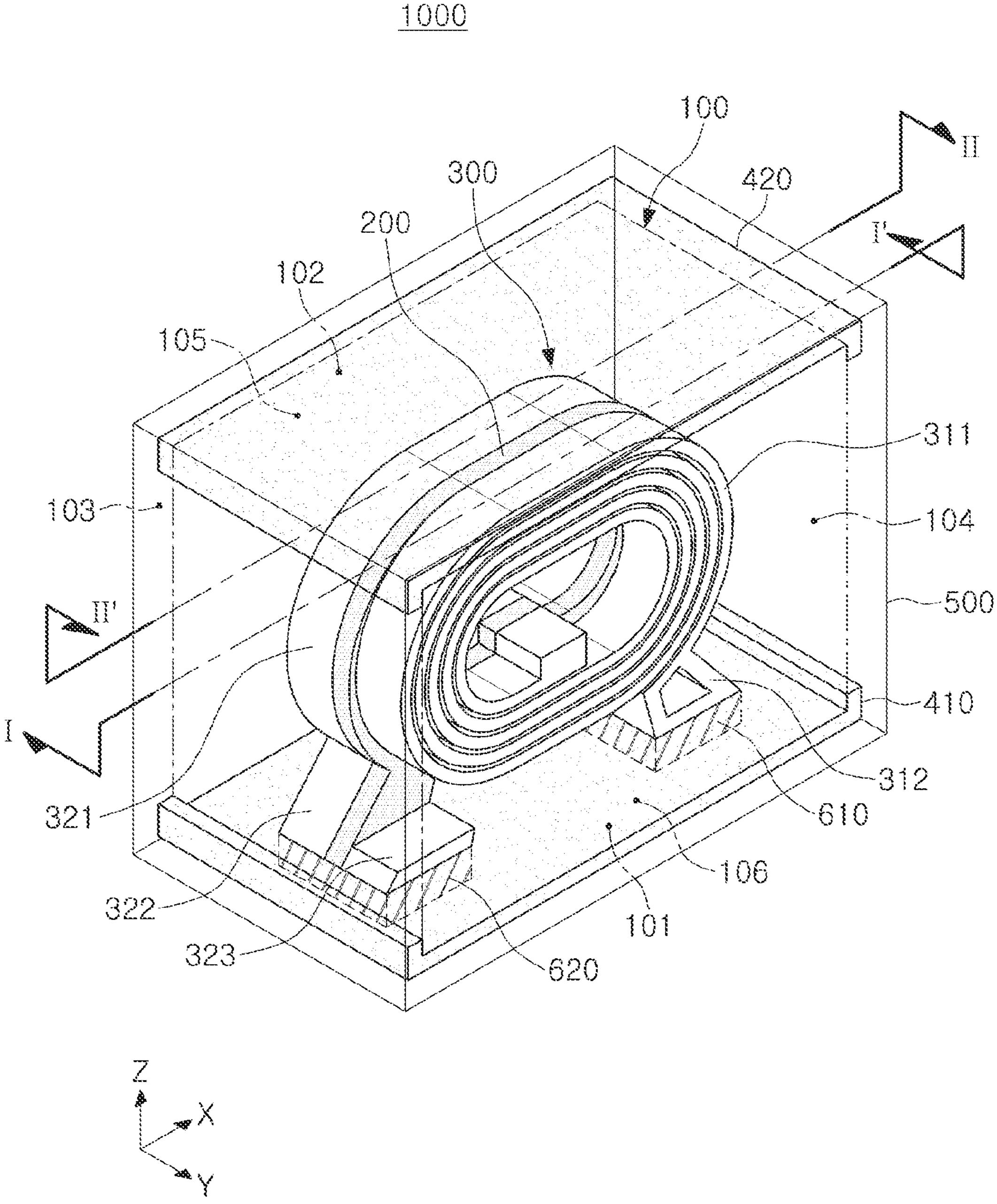
FIG. 1 is a schematic perspective view of a coil component according to an exemplary embodiment in the present disclosure.

FIG. 1 is a schematic perspective view of a coil component according to an exemplary embodiment in the present disclosure.

Figure 2:
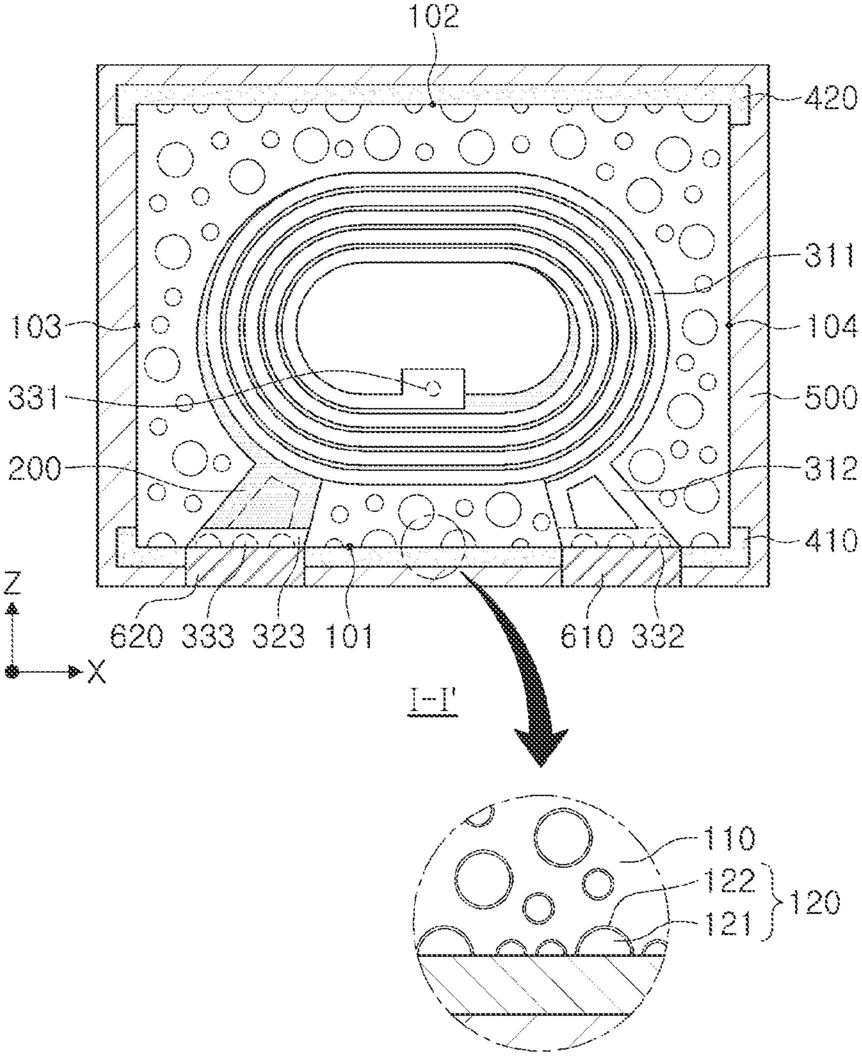
FIG. 2 is a schematic cross-sectional view of the coil component taken along line I-I' according to an exemplary embodiment in the present disclosure.

FIG. 2 is a schematic cross-sectional view of the coil component taken along line I-I' according to an exemplary embodiment in the present disclosure.

Figure 3:
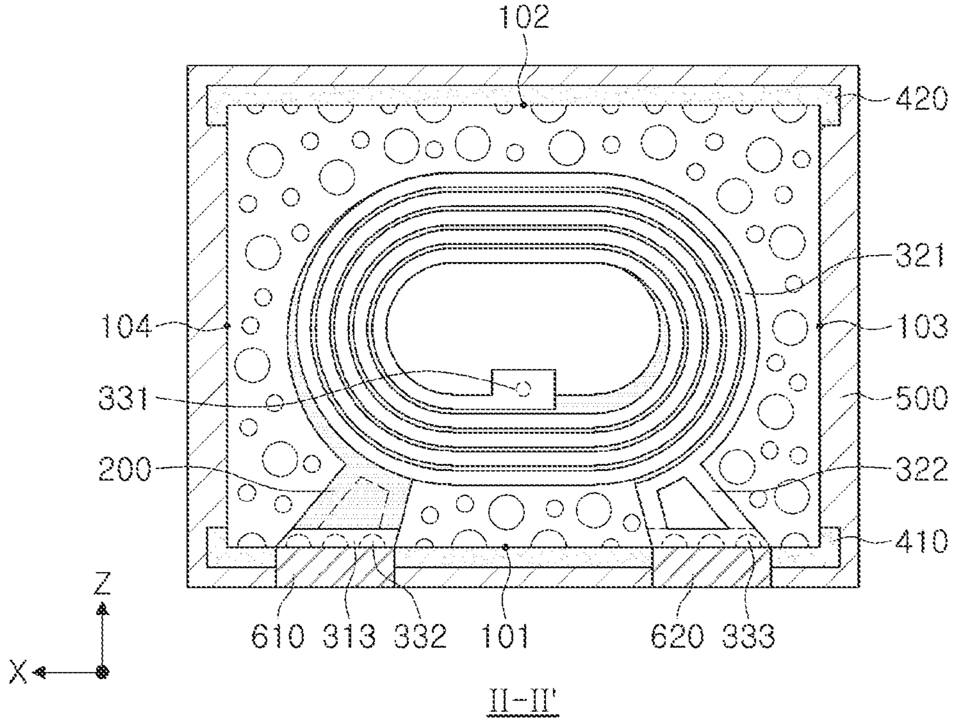
FIG. 3 is a schematic cross-sectional view of the coil component taken along line II-II' according to an exemplary embodiment in the present disclosure.

FIG. 3 is a schematic cross-sectional view of the coil component taken along line II-II' according to an exemplary embodiment in the present disclosure.

Referring to the drawings, a coil component 1000 according to an exemplary embodiment in the present disclosure may include: a body 100 having a first surface 101 and a second surface 102 opposing each other, and side surfaces 103, 104, 105 and 106 each connecting the first surface 101 and the second surface 102 to each other; a support member 200 disposed in the body 100; a coil unit 300 disposed in the body 100; and a first insulating layer 410 disposed on the first surface 101 of the body 100. In addition, the coil component 1000 according to an exemplary embodiment in the present disclosure may further include: at least one of first and second external electrodes 610 and 620 disposed on the first surface 101 of the body 100; a second insulating layer 420 disposed on the second surface 102 of the body 100; and a third insulating layer 500 covering the side surfaces 103, 104, 105 and 106 of the body 100.

The body 100 may form an exterior of the coil component 1000, and the coil unit 300 may be buried in the body 100.

The body 100 may have the first surface 101, the second surface 102 and at least one of the side surfaces 103, 104, 105 and 106 each connecting the first surface 101 and the second surface 102 to each other. The first surface 101 and the second surface 102 of the body 100 may be opposing each other in a Z-direction (e.g., a thickness direction or a first direction of the body 100). The plurality of side surfaces 103, 104, 105 and 106 may include the first side surface 103 and the second side surface 104 opposing each other in an X-direction (e.g., a length direction or a second direction of the body 100) and the third side surface 105 and the fourth side surface 106 opposing each other in a Y-direction (e.g., a width direction or a third direction of the body 100). The body 100 may substantially have a hexahedral shape, but is not limited thereto.

The body 100 may include a resin 110 and a magnetic material 120. In detail, the body 100 may be formed by stacking one or more magnetic composite sheets in which the magnetic material 120 is dispersed in the resin. The magnetic material 120 may include metallic magnetic powder particles 121, a surface of which is covered with an insulating layer 122, and is not limited thereto. The magnetic material 120 may be, for example, a ferrite.

In addition, the body 100 may include a core region penetrating through the coil unit 300 and the support member 200 to be described below. The core region may be formed by the magnetic composite sheet filling a through hole of the coil unit 300 and support member 200, and is not limited thereto.

The metallic magnetic powder particles 121 may include one or more selected from the group consisting of iron (Fe), silicon (Si), chromium (Cr), cobalt (Co), molybdenum (Mo), aluminum (Al), niobium (Nb), copper (Cu) and nickel (Ni). For example, the metallic magnetic powder particles 121 may be at least one of pure iron, Fe—Si-based alloy, Fe—Si—Al-based alloy, Fe—Ni-based alloy, Fe—Ni—Mo-based alloy, Fe—Cr-based alloy, or Fe—Cr—Si-based alloy.

The metallic magnetic powder particles 121 may be amorphous or crystalline. For example, the metallic magnetic powder particles 121 may be Fe—Si—B—Cr-based amorphous alloy powder, but is not necessarily limited thereto.

The insulating layer 122 may be thermosetting resin such as epoxy, or a metal oxide film such as aluminum (Al) or silicon (Si).

The ferrite may be, for example, at least one of a spinel type ferrite such as Mg—Zn-based ferrite, Mn—Zn-based ferrite, Mn—Mg-based ferrite, Cu—Zn-based ferrite, Mg—Mn—Sr-based ferrite or Ni—Zn-based ferrite; a hexagonal type ferrite such as Ba—Zn-based ferrite, Ba—Mg-based ferrite, Ba—Ni-based ferrite, Ba—Co-based ferrite or Ba—Ni—Co-based ferrite; and a garnet type ferrite such as Y-based ferrite or Li-based ferrite.

The resin 110 may use at least one of thermoplastic resin such as polyimide, the thermosetting resin such as epoxy and a liquid crystal polymer (LCP), and is not limited thereto.

Meanwhile, after a cutting (sawing) process of dividing the body into each individual chip, a burring may occur on the first surface 101 of the body 100, which is the cut surface, due to a lead pattern exposed during the cutting process. To remove such a burring, a grinding process may be additionally performed on the first surface 101 of the body 100. Here, among the metallic magnetic powder particles 121 included in the body 100, the metallic magnetic powder particles 121 adjacent to the first surface 101 of the body 100 may be cut by the grinding process, and its cut surface may thus be exposed to the first surface 101 of the body 100. As a result, the body 100 may include at least one metallic magnetic powder particle 121 having a surface substantially coplanar with the first surface 101 of the body 100.

The support member 200 may support the coil unit 300. The support member 200 may be disposed in the body 100 to be substantially perpendicular to the first surface 101 of the body 100. Therefore, the coil unit 300 disposed on the support member 200 may also be disposed to be substantially perpendicular to the first surface 101 of the body 100. Here, the expression "substantially perpendicular" may refer to not only a right angle which is perfectly 90°, but also a right angle which includes a range of error occurring in the process. For example, the support member 200 and the coil unit 300 may each achieve an angle of 80° to 100° with the first surface 101 of the body 100.

The support member 200 may include an insulating material including thermosetting insulating resin such as epoxy resin, thermoplastic insulating resin such as polyimide, or photosensitive insulating resin, or an insulating material including such insulating resin and a reinforcing material such as glass fiber or inorganic filler.

An overall shape of the support member 200 may correspond to that of the coil unit 300, and is not limited thereto.

The coil unit 300 may be disposed in the body 100 and may exhibit a characteristic of the coil component 1000.

The coil unit 300 may include first and second coil patterns 311 and 321 respectively disposed on the support member 200 and first and second lead patterns 312 and 322 respectively extending from the first and second coil patterns 311 and 321 and exposed to the first surface 101 of the body 100. In detail, the coil unit 300 may include the first coil pattern 311 disposed on a first surface of the support member 200, the first lead pattern 312 extending from the first coil pattern 311 and exposed to the first surface 101 of the body, the second coil pattern 321 disposed on a second surface of the support member 200 opposite to the first surface of the support member 200, and the second lead pattern 322 extending from the second coil pattern 321 and exposed to the first surface 101 of the body. Here, the first and second lead patterns 312 and 322 may also be disposed on opposite surfaces of the support member 200, respectively.

In addition, the coil unit 300 may further include a connection via 331 penetrating through the support member 200 and connecting the first and second coil patterns 311 and 321 to each other.

Each of the first and second coil patterns 311 and 321 may have a plurality of turns and the shape of a flat helix.

Each of the first and second coil patterns 311 and 321 may include a conductive material such as copper (Cu), aluminum (Al), silver (Ag), tin (Sn), gold (Au), nickel (Ni), lead (Pb), titanium (Ti) or alloys thereof.

Each of the first and second coil patterns 311 and 321 may be formed by forming a first plating layer on the support member 200 through electroless plating or the like, and a second plating layer on the first plating layer through electroplating or the like. In this case, each of the first and second coil patterns 311 and 321 may include the plurality of metal layers.

The first and second coil patterns 311 and 321 may be disposed to be opposing each other in a direction substantially parallel to the first surface 101 of the body 100. The first and second coil patterns 311 and 321 may not be necessarily parallel to the first surface 101 of the body 100.

The first and second lead patterns 312 and 322 may connect the coil unit 300 to the first and second external electrodes 610 and 620, respectively. The first and second lead patterns 312 and 322 may be exposed to the first surface 101 of the body 100, and thus be connected to the first and second external electrodes 610 and 620, respectively.

Each of the first and second lead patterns 312 and 322 may have a surface substantially coplanar with the first surface 101 of the body 100. As described above, the cutting and grinding processes may be performed on the first surface 101 of the body 100, and through these processes, each of the first and second lead patterns 312 and 322 may have the surface substantially coplanar with the first surface 101 of the body 100.

The first and second lead patterns 312 and 322 may be connected to an outermost turn of the plurality of turns of the first and second coil patterns 311 and 321, respectively.

Each of the first and second lead patterns 312 and 322 may not be limited to a particular shape, and may have various shapes without being limited to the shape shown in the drawings.

Each of the first and second lead patterns 312 and 322 may include the conductive material such as copper (Cu), aluminum (Al), silver (Ag), tin (Sn), gold (Au), nickel (Ni), lead (Pb), titanium (Ti) or alloys thereof.

Each of the first and second lead patterns 312 and 322 may be formed by forming a first plating layer on the support member 200 through electroless plating or the like, and a second plating layer on the first plating layer through electroplating or the like. In this case, each of the first and second lead patterns 312 and 322 may include the plurality of metal layers.

Each of the first and second lead patterns 312 and 322 may be integrally formed with each of the first and second coil patterns 311 and 321, and thus may not have a boundary therebetween.

The connection via 331 may pass through the support member 200 to connect the first and second lead patterns 312 and 322 to each other, and through this connection, the coil unit 300 may function as a single coil as a whole.

The connection via 331 may include the conductive material such as copper (Cu), aluminum (Al), silver (Ag), tin (Sn), gold (Au), nickel (Ni), lead (Pb), titanium (Ti) or alloys thereof.

The connection via 331 may forma via hole penetrating through the support member 200 through laser processing or the like, a first plating layer on a wall surface of the via hole through electroless plating or the like, and a second plating layer on the first plating layer to fill the via hole through electroplating or the like. In this case, the connection via 331 may include the plurality of metal layers.

The connection via 331 may be integrally formed with each of the first and/or second coil patterns 311 and/or 321, and thus may not have a boundary therebetween.

Meanwhile, the coil unit 300 may further include first and second auxiliary patterns 313 and 323 respectively disposed on the opposite surfaces of the support member 200, and respectively spaced apart from the second and first coil patterns 321 and 311. In detail, the second auxiliary pattern 323 is disposed on the first surface of the support member 200 to be spaced apart from the first coil pattern 311, and the first auxiliary pattern 313 is disposed on the second surface of the support member 200 to be spaced apart from the second coil pattern 321. Here, the first and second auxiliary patterns 313 and 323 may also be disposed on opposite surfaces of the support member 200, respectively.

In addition, the coil unit 300 may further include first and second auxiliary vias 332 and 333, penetrating through the support member 200 and connecting the first and second lead patterns 312 and 322 to the first and second auxiliary patterns 313 and 323, respectively.

the first and second auxiliary patterns 313 and 323 may be exposed to the first surface 101 of the body 100, and thus be connected to the first and second external electrodes 610 and 620, respectively.

Each of the first and second auxiliary patterns 313 and 323 may serve to secure a plating area of the first and second external electrodes 610 and 620. In detail, when the first and second external electrodes 610 and 620 are formed through plating, it may be difficult to form a plating layer on the body 100 which is an insulating material. Therefore, it is possible to additionally form the first and second auxiliary patterns 313 and 323 in addition to the first and second lead patterns 312 and 322, and thus possible to easily form the plating layer also on the first and second auxiliary patterns 313 and 323 in addition to the first and second lead patterns 312 and 322.

Each of the first and second auxiliary patterns 313 and 323 may include the conductive material such as copper (Cu), aluminum (Al), silver (Ag), tin (Sn), gold (Au), nickel (Ni), lead (Pb), titanium (Ti) or alloys thereof.

Each of the first and second auxiliary patterns 313 and 323 may be formed by forming a first plating layer on the support member 200 through electroless plating or the like, and a second plating layer on the first plating layer through electroplating or the like. In this case, each of the first and second auxiliary patterns 313 and 323 may include the plurality of metal layers.

The first and second auxiliary patterns 313 and 323 may each be formed through the same process as that of the first and second coil patterns 311 and 321 and/or that of the first and second lead patterns 312 and 322.

The first and second auxiliary vias 332 and 333 may be exposed to the first surface 101 of the body 100, and thus be connected to the first and second external electrodes 610 and 620, respectively.

Each of the first and second auxiliary vias 332 and 333 may also serve to secure the plating area of the first and second external electrodes 610 and 620. In detail, when the first and second external electrodes 610 and 620 are formed through plating, it may be difficult to form a plating layer on the support member 200 which is the insulating material. Therefore, it is possible to additionally form the first and second auxiliary vias 332 and 333, and thus possible to easily form the plating layer also on the first and second auxiliary vias 332 and 333.

Each of the first and second auxiliary vias 332 and 333 may include the conductive material such as copper (Cu), aluminum (Al), silver (Ag), tin (Sn), gold (Au), nickel (Ni), lead (Pb), titanium (Ti) or alloys thereof.

In a state in which a plurality of support members 200 are connected to each other before forming each individual chip, each of the first and second auxiliary vias 332 and 333 may be formed by forming a via hole penetrating through the support members 200 adjacent to each other through laser processing or the like, a first plating layer on the wall surface of the via hole through electroless plating or the like, and a second plating layer on the first plating layer to fill the via hole through electroplating or the like. In this case, each of the first and second auxiliary vias 332 and 333 may include the plurality of metal layers. In addition, each of the first and second auxiliary vias 332 and 333 may have the shape of a semicircular column having a cylinder cut, and is not limited thereto.

The first insulating layer 410 may secure the insulation of the body 100. As described above, at least one metallic magnetic powder particle 121 may be exposed to the first surface 101 of the body 100 by the grinding process, and spread plating may thus occur when the external electrodes 610 and 620 are formed, and it is possible to secure the insulation of the body 100 by forming the first insulating layer 410 on the first surface 101 of the body 100.

Meanwhile, the insulation of the body may be secured by performing acid treatment on the surface of the exposed metallic magnetic powder particle 121. However, in this case, the inductance of the coil component 1000 may be deteriorated.

On the contrary, the coil component 1000 according to the exemplary embodiment may secure the insulation of the body 100 by forming the first insulating layer 410 instead of performing the acid treatment, thereby preventing its inductance from being deteriorated while securing the insulation of coil component 1000.

The first insulating layer 410 may have first and second openings exposing at least a portion of the first and second lead patterns 312 and 322, respectively. The first and second external electrodes 610 and 620 may be respectively disposed in the first and second openings of the first insulating layer 410, and the first and second lead patterns 312 and 322 may thus be connected to the first and second external electrodes 610 and 620, respectively.

In a case where the coil unit 300 further includes the first and second auxiliary patterns 313 and 323, the first and second openings may further expose the first and second auxiliary patterns 313 and 323, respectively. In addition, in a case where the coil unit 300 further includes the first and second auxiliary vias 332 and 333, the first and second openings may further expose the first and second auxiliary vias 332 and 333, respectively.

A method of forming each of the first and second openings is not particularly limited, and the openings may be formed by laser processing.

Meanwhile, the first insulating layer 410 may extend on the side surfaces 103, 104, 105 and 106 of the body 100 based on a method of forming the first insulating layer 410. Therefore, the first insulating layer 410 extending on the side surfaces of the body 100 may be covered with the third insulating layer 500.

The first insulating layer 410 may cover only a portion of each of the side surfaces 103, 104, 105 and 106 of the body 100 as shown in the drawings, or may cover an entire portion of each of the side surfaces 103, 104, 105 and 106 of the body 100 unlike as shown in the drawings. In addition, the first insulating layer 410 may extend on each of the plurality of side surfaces 103, 104, 105 and 106 of the body 100, or may extend only on some of the plurality of side surfaces 103, 104, 105 and 106 of the body 100.

The method of forming the first insulating layer 410 is not particularly limited, and it is possible to use a method in which a material forming the first insulating layer 410 may be coated on the first surface 101 of the body 100, and the first insulating layer 410 is not limited to this method. For example, the first insulating layer 410 may be formed by stacking an insulating film on the first surface 101 of the body 100 or by applying an insulating paste to the first surface 101 of the body 100.

An insulating material may be used as the material of forming the first insulating layer 410, and it is possible to use at least one of thermoplastic resin such as polyimide, thermosetting resin such as epoxy, photosensitive resin, perylene and silica ($SiO_2$) for example, and the first insulating layer 410 is not limited to this material.

The second insulating layer 420 may be disposed on the second surface 102 of the body 100 to secure the insulation of the body 100. In the case where the grinding process is performed on the first surface 101 and the second surface 102 of the body 100, at least one metallic magnetic powder particle 121 may also be exposed to the second surface 102 of the body 100, and the spread plating may occur when the external electrodes 610 and 620 are formed, and it is possible to secure the insulation of the body 100 by forming the second insulating layer 420 on the second surface 102 of the body 100.

Meanwhile, the second insulating layer 420 may extend on the side surfaces 103, 104, 105 and 106 of the body 100 based on a method of forming the second insulating layer 420. Therefore, the second insulating layer 420 extending on the side surfaces of the body 100 may be covered with the third insulating layer 500.

The second insulating layer 420 may cover only a portion of each of the side surfaces 103, 104, 105 and 106 of the body 100 as shown in the drawings, or may cover an entire portion of each of the side surfaces 103, 104, 105 and 106 of the body 100 unlike as shown in the drawings. In addition, the second insulating layer 420 may extend on each of the plurality of side surfaces 103, 104, 105 and 106 of the body 100, or may extend only on some of the plurality of side surfaces 103, 104, 105 and 106 of the body 100.

The method of forming the second insulating layer 420 is not particularly limited, and it is possible to use a method in which the material forming the first insulating layer 410 may be coated on the second surface 102 of the body 100, and the method is not limited thereto. For example, the second insulating layer 420 may be formed by stacking an insulating film on the second surface 102 of the body 100 or by applying an insulating paste to the second surface 102 of the body 100. The method of forming the second insulating layer 420 may be the same as or different from the method of forming the first insulating layer 410.

An insulating material may be used as the material of forming the second insulating layer 420, and it is possible to use at least one of thermoplastic resin such as polyimide, thermosetting resin such as epoxy, photosensitive resin, perylene and silica ($SiO_2$) for example, and the second insulating layer 420 is not limited to this material. The material of forming the second insulating layer 420 may be the same as or different from the material of forming the first insulating layer 410.

The third insulating layer 500 may additionally secure the insulation of the body 100.

The third insulating layer 500 may be formed on the side surfaces 103, 104, 105 and 106 of the body 100. Therefore, the third insulating layer 500 may additionally secure the insulation of a region of the body 100, in which the first and second insulating layers 410 and 420 are not formed. However, the third insulating layer 500 may also be formed on the first and second insulating layers 410 and 420.

The magnetic material 120 such as the metallic magnetic powder particles 121 may be exposed even to the side surfaces 103, 104, 105 and 106 of the body 100, and the third insulating layer 500 may thus be additionally formed on the body 100 to secure the insulation of the body 100.

The third insulating layer 500 may extend on the first surface 101 of the body 100 to cover the first insulating layer 410. Here, each of the first and second openings may extend to penetrate through the third insulating layer 500. Therefore, the first and second lead patterns 312 and 322 may be exposed by the first and second openings, respectively, formed to extend to penetrate through the first insulating layer 410 and the third insulating layer 500. The third insulating layer 500 may cover an entire portion of the first insulating layer 410 disposed on the first surface 101 of the body 100, or may cover a portion of the first insulating layer 410.

The first and second openings each extending to the first insulating layer 410 and the third insulating layer 500 may be formed by forming the first insulating layer 410 on the first surface 101 of the body 100 and then by laser processing only the first insulating layer 410 or the like before forming the third insulating layer 500. Alternatively, each of the first and second openings may be formed by forming both the first insulating layer 410 and the third insulating layer 500 on the first surface 101 of the body 100 and then by laser processing the first insulating layer 410 and the third insulating layer 500 or the like.

Each of the first and second external electrodes 610 and 620 may be disposed to be spaced apart from each other on the first surface 101 of the body 100 and connected to the coil unit 300. In detail, the first and second external electrodes 610 and 620 may respectively have at least a portion disposed in the first and second openings, and may respectively connected to the first and second lead patterns 312 and 322.

In addition, in the case where the coil unit 300 further includes the first and second auxiliary patterns 313 and 323, the first and second external electrodes 610 and 620 may be respectively connected to the first and second auxiliary patterns 313 and 323. In addition, in the case where the coil unit 300 further includes the first and second auxiliary vias 332 and 333, the first and second external electrodes 610 and 620 may also be connected to the first and second auxiliary vias 332 and 333, respectively.

Each of the first and second external electrodes 610 and 620 may include the conductive material such as copper (Cu), aluminum (Al), silver (Ag), tin (Sn), gold (Au), nickel (Ni), lead (Pb), chromium (Cr), titanium (Ti) or alloys thereof.

Each of the first and second external electrodes 610 and 620 may be formed in a single layer or a plurality of layers structure. For example, each of the first and second external electrodes 610 and 620 may include a first layer including copper (Cu), a second layer disposed on the first layer and including nickel (Ni), and a third layer disposed on the second layer and including tin (Sn). Each of the first to third layers may be formed by electroplating, but is not limited thereto.

Meanwhile, the first external electrode 610 and the second external electrode 620 may be disposed only on the first surface 101 of the body 100, and may not be disposed on the second surface 102 and the plurality of side surfaces 103, 104, 105 and 106. Due to this structure, the coil component 1000 may be miniaturized.

Figure 4:
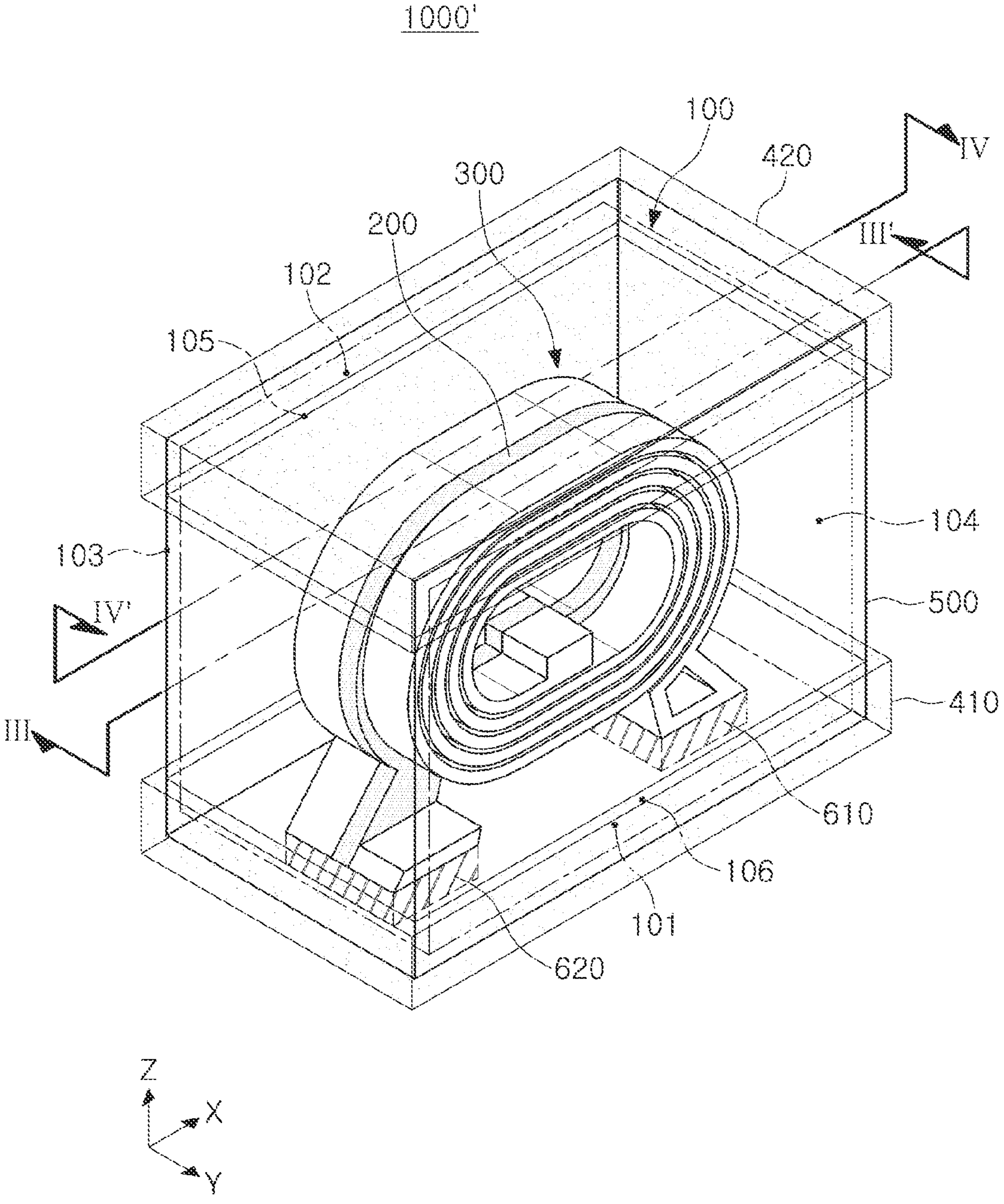
FIG. 4 is a schematic perspective view of a coil component according to another exemplary embodiment in the present disclosure.

FIG. 4 is a schematic perspective view of a coil component according to another exemplary embodiment in the present disclosure.

Figure 5:
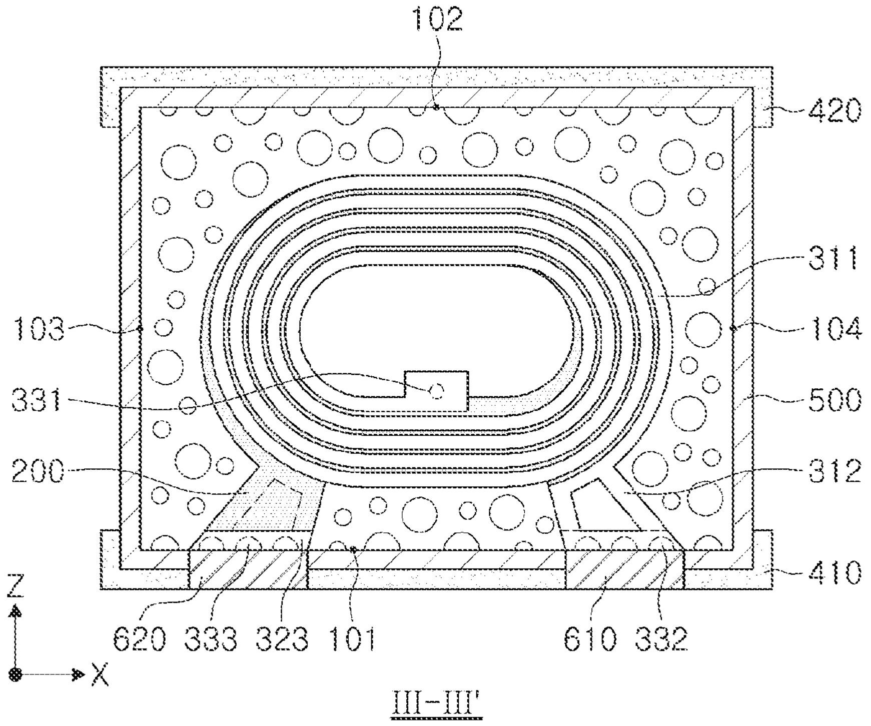
FIG. 5 is a schematic cross-sectional view of the coil component taken along line III-III' according to another exemplary embodiment in the present disclosure.

FIG. 5 is a schematic cross-sectional view of the coil component taken along line according to another exemplary embodiment in the present disclosure.

Figure 6:
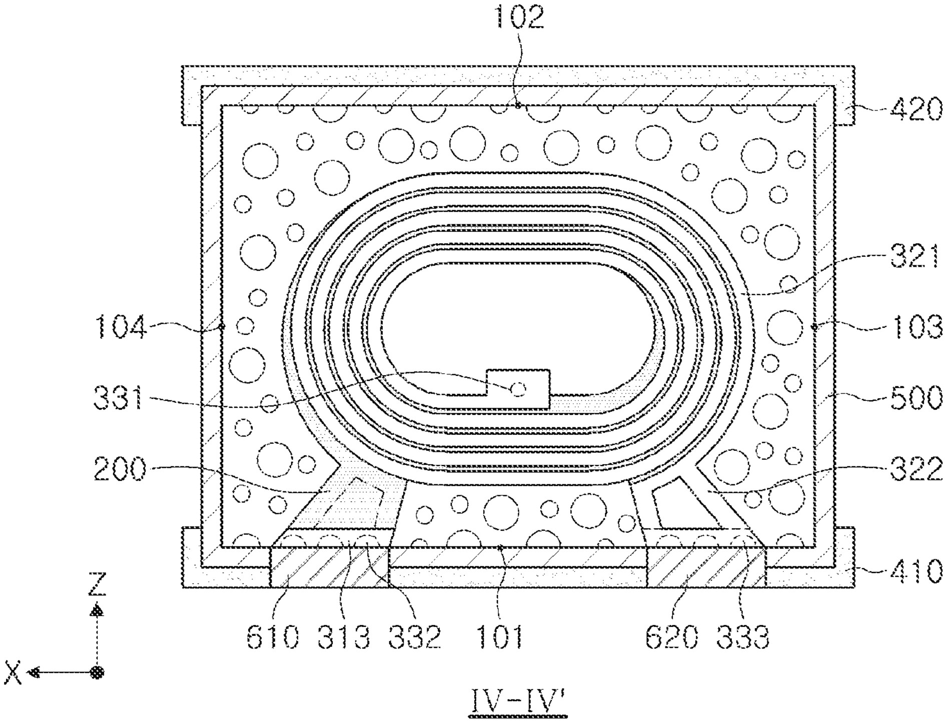
FIG. 6 is a schematic cross-sectional view of the coil component taken along line IV-IV' according to another exemplary embodiment in the present disclosure.

FIG. 6 is a schematic cross-sectional view of the coil component taken along line IV-IV' according to another exemplary embodiment in the present disclosure.

A coil component 1000' according to another exemplary embodiment is different from the coil component 1000 according to an exemplary embodiment in an arrangement of the first insulating layer 410, the second insulating layer 420 and the third insulating layer 500.

In the coil component 1000' according to another exemplary embodiment, the third insulating layer 500 may first be formed, and the first insulating layer 410 and the second insulating layer 420 may then be formed. Therefore, the third insulating layer 500 may be disposed on the body 100, and the first insulating layer 410 and the second insulating layer 420 may then be disposed on the third insulating layer 500.

Therefore, in a case where the third insulating layer 500 extends on the first surface 101 of the body 100, the third insulating layer 500 may extend on the first surface 101 of the body 100 to be disposed between the first surface 101 of the body 100 and the first insulating layer 410.

The remainder of the description may be substantially the same as the description of the coil component according to an exemplary embodiment in the present disclosure, and thus a detailed description thereof is omitted.

However, the coil component according to each exemplary embodiment in the present disclosure is to explain that the coil component of the present disclosure may have various structures, and is not intended to limit the structure of the coil component according to the present disclosure to the exemplary embodiments of the present disclosure.

Asset forth above, the present disclosure may provide the coil component for minimizing occurrence of a burring.

The present disclosure may also provide the coil component for preventing the spread plating.

The present disclosure may also provide the coil component for preventing the deterioration of its inductance (Ls).

The present disclosure may also provide the coil component having the enhanced insulation property.

The present disclosure may also provide the coil component for miniaturizing its product.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface and a second surface opposing each other in a first direction, and a side surface connecting the first surface and the second surface to each other;

a support member disposed in the body;

a coil unit disposed in the body and including a coil pattern disposed on the support member and first and second lead patterns respectively extending from the coil pattern and exposed to the first surface of the body;

a first insulating layer disposed on the first surface of the body and having first and second openings exposing at least a portion of the first and second lead patterns, respectively; and a second insulating layer disposed on the first insulating layer and covering the side surface of the body, wherein the first insulating layer is arranged between the body and second insulating layer in the first direction, and wherein the second insulating layer is disposed directly on the side surface of the body.

2. The coil component of claim 1, further comprising a third insulating layer disposed on the second surface of the body.

3. The coil component of claim 1, wherein the second insulating layer extends on the first surface of the body to cover the first insulating layer, and each of the first and second openings extends to penetrate through the second insulating layer.

4. The coil component of claim 3, wherein the first insulating layer extends on the side surface of the body.

5. The coil component of claim 1, wherein each of the first and second openings extends to penetrate through the second insulating layer.

6. The coil component of claim 1, wherein the body includes a metallic magnetic powder particle having a surface substantially coplanar with the first surface of the body.

7. The coil component of claim 1, wherein each of the first and second lead patterns has a surface substantially coplanar with the first surface of the body.

8. The coil component of claim 1, further comprising first and second external electrodes respectively having at least a portion disposed in the first and second openings and respectively connected to the first and second lead patterns.

9. A coil component comprising:

a body;

a support member disposed in the body;

a coil unit disposed in the body and including first and second coil patterns respectively disposed on opposite surfaces of the support member and first and second lead patterns respectively extending from the first and second coil patterns and exposed to a first surface of the body;

an insulating layer disposed on the first surface of the body and having first and second openings respectively exposing the first and second lead patterns; and first and second external electrodes respectively having at least a portion disposed in the first and second openings and respectively connected to the first and second lead patterns, wherein the first and second coil patterns are opposing each other in a direction substantially parallel to the first surface of the body, wherein the insulating layer comprises a first insulating layer and a second insulating layer disposed on the first insulating layer, and wherein at least one of the first or second insulating layer extends onto a portion of a side surface of the body so as to expose another portion of the side surface from the at least one of the first or second insulating layer.

10. The coil component of claim 9, further comprising first and second auxiliary patterns respectively disposed on the opposite surfaces of the support member and respectively spaced apart from the second and first coil patterns, wherein each of the first and second auxiliary patterns is exposed to the first surface of the body.

11. The coil component of claim 10, further comprising first and second auxiliary vias penetrating through the support member and connecting the first and second auxiliary patterns to the first and second lead patterns, respectively, wherein each of the first and second auxiliary vias is exposed to the first surface of the body.

12. A coil component comprising:

a body having a first surface and a second surface opposing each other in a first direction;

a support member disposed in the body;

a coil unit disposed in the body and including a coil pattern disposed on the support member and first and second lead patterns spaced apart from a side surface of the body and respectively extending from the coil pattern and exposed to the first surface of the body;

a first insulating layer and a second insulating layer disposed on the first surface of the body and at least partially overlapping each other in the first direction; and first and second external electrodes each penetrating through the first and second insulating layers and respectively connected to the first and second lead patterns, wherein at least one of the first or second insulating layer extends from the first surface directly onto the side surface of the body.

13. The coil component of claim 12, wherein the first insulating layer is in contact with the first surface of the body, and extends on a portion of the side surface of the body connecting the first surface to the second surface of the body, and the second insulating layer extends on the side surface of the body to cover the first insulating layer.

14. The coil component of claim 13, further comprising a third insulating layer disposed on the second surface of the body, and wherein the second insulating layer further extends on the second surface of the body to cover the third insulating layer.

15. The coil component of claim 12, wherein the second insulating layer is in contact with the first surface of the body, and extends along the side surface of the body, connecting the first surface to the second surface of the body, and the second surface of the body, and the first insulating layer is disposed to cover the second insulating layer on the first surface of the body, and extends on a portion of the side surface of the body to cover the second insulating layer.

16. The coil component of claim 15, further comprising a third insulating layer disposed on a portion of the second insulating layer extending onto the second surface of the body.

17. The coil component of claim 12, further comprising first and second auxiliary patterns respectively disposed on the opposite surfaces of the support member and respectively spaced apart from the second and first coil patterns, wherein each of the first and second auxiliary patterns is exposed to the first surface of the body.

18. The coil component of claim 17, further comprising first and second auxiliary vias penetrating through the support member and connecting the first and second auxiliary patterns to the first and second lead patterns, respectively, wherein each of the first and second auxiliary vias is exposed to the first surface of the body.

* * * * *